United States Patent [19]

Gorin et al.

[11] Patent Number: 5,212,821
[45] Date of Patent: May 18, 1993

[54] MACHINE-BASED LEARNING SYSTEM

[75] Inventors: Allen L. Gorin, Fairlawn; Stephen E. Levinson, Westfield, both of N.J.

[73] Assignee: AT&T Bell Laboratories, Murray Hill, N.J.

[21] Appl. No.: 677,043

[22] Filed: Mar. 29, 1991

[51] Int. Cl.⁵ .............................................. G06F 15/18
[52] U.S. Cl. ........................................ 395/22; 395/2; 382/15
[58] Field of Search ................. 395/2, 22, 23; 381/43; 382/14, 15

[56] References Cited

U.S. PATENT DOCUMENTS

| | | | |
|---|---|---|---|
| 4,618,984 | 10/1986 | Das et al. | 395/2 |
| 5,027,406 | 6/1991 | Roberts et al. | 395/2 |

OTHER PUBLICATIONS

"Stationary and Nonstationary Learning Characteristics of the LMS Adaptive Filter", by B. Widrow, J. M. McCool, M. G. Larimore and C. R. Johnson, Jr., Proceedings of the IEEE, vol. 64, No. 8, Aug. 1976, pp. 1151–1162.
"On Adaptive Acquisition of Language", by A. L. Gorin, S. E. Levinson, L. G. Miller, A. N. Gertner, A. Ljolje and E. R. Goldman, published in Proceedings of ICASSP'90, Apr. 1990.
"Adaptive Acquisition of Language", by A. L. Gorin, S. E. Levinson, A. N. Gertner and E. Goldman, published in Proceedings of the Sixth Yale Workshop on Adaptive and Learning Systems, Aug. 1990.

*Primary Examiner*—Allen R. MacDonald
*Attorney, Agent, or Firm*—Geoffrey D. Green

[57] ABSTRACT

A machine-based learning system receives inputs and proposes outputs using a network of connection weights to relate the inputs to the outputs. When a user affirms a proposed output, the system adjusts the connection weights to strengthen the relationship between elements of the inputs and that output. Learning occurs in the course of successive iterations as the connection weights adapt to relationships between semantically-significant input elements and related outputs. The system can be used to acquire language from inputs provided in the form of text or speech such that the connection weights adapt to semantically-significant words without need for defining word meanings. Such language acquisition contrasts with previous systems in which words are predefined..

19 Claims, 4 Drawing Sheets

MACHINE-BASED LEARNING SYSTEM

TECHNICAL BACKGROUND

This invention relates to learning systems or learning machines and more particularly to systems that learn associations between received messages and desired outputs or actions.

DESCRIPTION OF THE PRIOR ART

Learning systems are useful in many contexts. For example, speech recognition systems are known that learn to recognize specific words or sentences. Such prior-art systems are traditionally trained by successively applying inputs to the decision-making mechanism of the system, together with the desired output, comparing the actual output of the system with the desired output and using the difference (error) to adjust parameters of the decision-making mechanism. Such learning can be described as learning by example. A drawback of such learning method is the large number of training examples often needed to enable a learning system to reach an acceptable level of performance and the effort needed to prepare the examples.

It is desirable to have a system that would learn by doing, that is, a system that would respond to inputs, perhaps randomly at the start, and learn from successive inputs (or lack thereof), whether such response was appropriate or not. In such a system the desired response does not have to be pre-programmed or built into the system; the system discovers the response itself by trial and error. Such learning by doing would be particularly useful in language acquisition and/or voice actuation systems.

SUMMARY OF THE INVENTION

In accordance with one aspect of the invention, a machine-based learning system receives inputs and proposes outputs or actions using a network of connection weights to relate elements (e.g. words, phrases, sounds, signal patterns) of the inputs to the actions. The system analyzes the inputs to identify distinguishable elements therein and establishes a new recognition node for each new element in the message, such recognition node being activated when its associated element appears in an input. Connection weights are established between each new recognition node and each possible output. For each possible output, the system combines the connection weights for the activated recognition nodes and proposes the output with the most favorable combination. If an affirmative response is received to the proposed output from the user or other decision authority, the system adjusts the connection weights to strengthen the relationship between the activated recognition nodes and the proposed output and can then initiate that output. The system can also be arranged to adjust the connection weights to weaken the relationship between activated recognition nodes and proposed outputs receiving negative responses. Learning occurs in the course of successive iterations as the connection weights adapt to relationships between semantically significant input elements and related outputs. The system can be used to acquire language from inputs provided in the form of text or speech such that the connection weights adapt to semantically-significant words (or groups of words) without need for explicitly defining word meanings. Such language acquisition contrasts with previous systems in which words are predefined.

Other aspects of the invention will become apparent from the following description.

DETAILED DESCRIPTION

In the course of describing the invention, it will be helpful to describe learning systems for acquiring human language from either speech or text. However, it will become clear that the invention can be used for applications other than human language acquisition. For example, it may be desired to train a system to recognize significant subsets of signals out of a pattern of electrical, acoustic or other signals and to associate the semantically significant subsets with respective desired actions.

Figure 1:
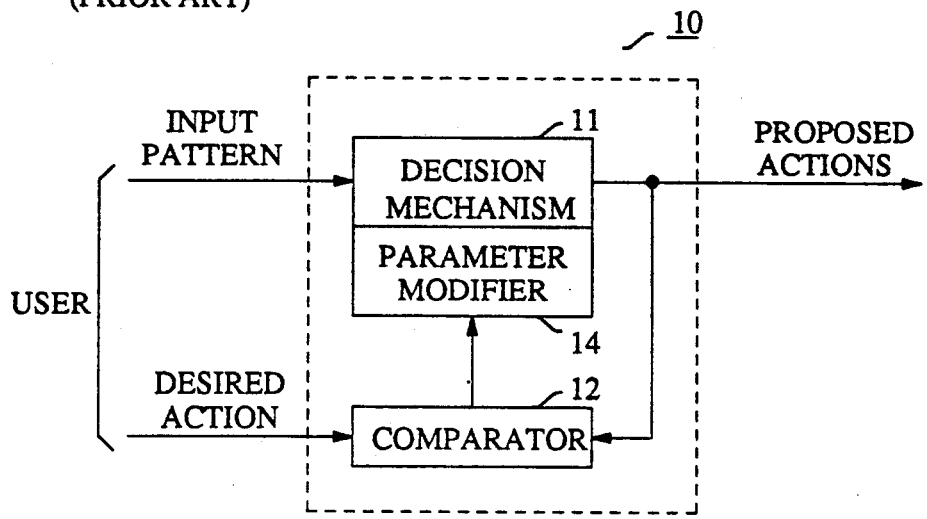
FIG. 1 is a block diagram of a learning system exemplifying learning by example, as in the prior art.

FIG. 1 is a generalized block diagram of a learning system 10 exemplifying learning by example, as in the prior art. Such learning system includes a decision mechanism 11 for accepting an input from a user and proposing actions, a comparator 12 for comparing a proposed action with a desired action, also provided by the user, and a parameter modifier 13 for modifying decision mechanism 10 in accordance with the results of the comparison. For a learning system acquiring language from speech or text, the input is a speech or text message. Decision mechanism 11 includes an appropriate analyzer to convert the message to words, and the desired action is an indication of the action to be taken by decision mechanism 11 in response to such message. In other words, the semantic significance of the message forming the input pattern is presented to learning system 10 at the same time as the message itself. If the decision mechanism prescribes the wrong action, comparator 12 transmits an error signal to parameter modifier 14, which then modifies decision mechanism 11 in such a way as to decrease the error signal.

Figure 2:
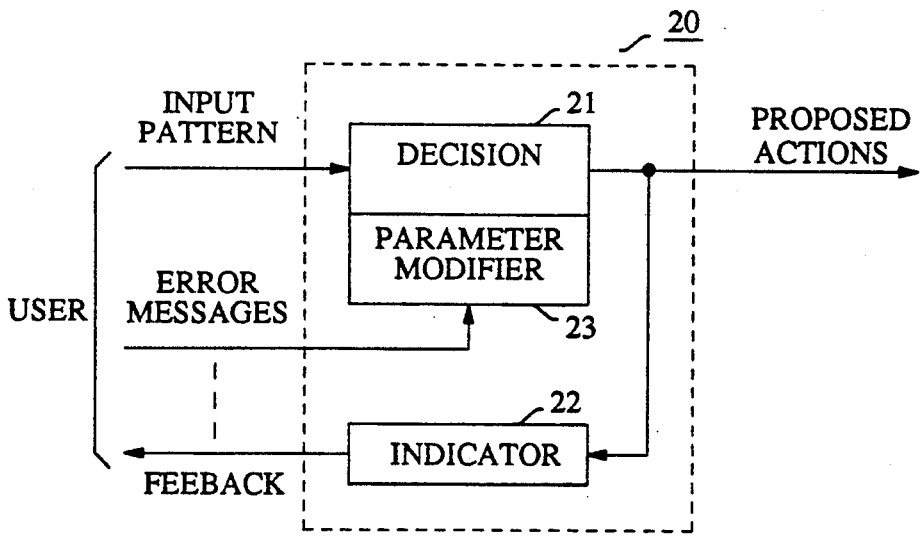
FIG. 2 is a block diagram of a learning system exemplifying learning by doing in accordance with the present invention.

FIG. 2 is a generalized block diagram of a learning system 20 exemplifying learning by doing in accordance with the present invention. Such learning system also includes a decision mechanism 21 for accepting inputs and proposing outputs or actions, but instead of a direct input from the user specifying the desired action, learning system 20 accepts messages from the user indicating whether proposed actions, made known to the user by indicator 22, are appropriate or not. Such messages cause parameter modifier 23 to modify decision mechanism 21 in such a way that the decision mechanism "learns" the semantic significance of elements in the inputs in relation to the actions desired. Again for a learning system acquiring language from speech or text, the input pattern is a speech or text message and decision mechanism 21 includes an appropriate analyzer for converting the message to words. The error messages can also be in the form of words; in fact, as will be described, the error messages themselves can be furnished over the same channel as the initial input pattern, with affirmation and/or negation being indicated by certain words. Indicator 22 can be configured to display text or speak words to the user as desired. Thus, system 20 can acquire the relationships among semantically significant words and desired outputs in the course of "conversations" with a user.

The present invention will now be described in more detail in terms of a learning system for accepting words from text or speech and controlling a process. Input to the system is in the form of input messages from the user in some language, such as the English language. Output is in the form of proposing one of a finite number of possible actions to the user and, if the action is affirmed by the user, initiating the action in the controlled process. As successive input messages are received, the learning system develops relationships among semantically significant words in the input messages and desired actions in the controlled process.

Figure 3:
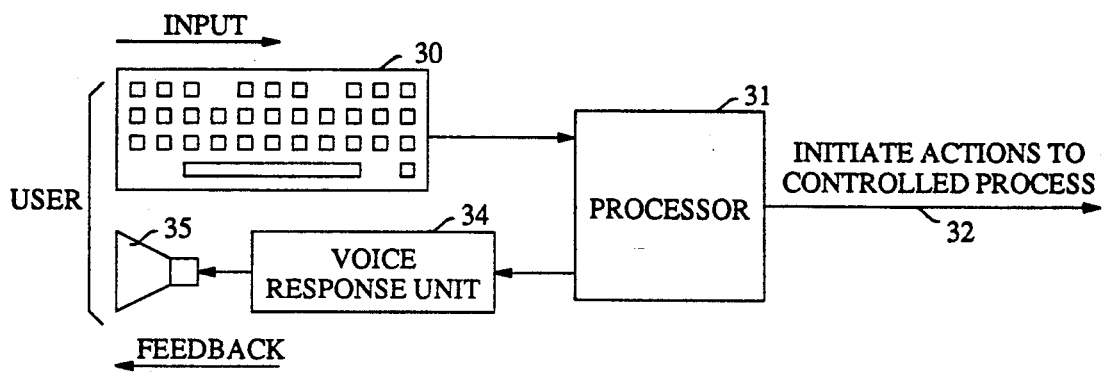
FIG. 3 is a block diagram of a text-activated system for use in accordance with the present invention.

In order to more clearly emphasize the principles of the invention, it will be convenient to first describe a learning system having text input. FIG. 3 is a block diagram of such a system. Text passes from a user via keyboard 30 to processor 31, which can be a general-purpose digital computer. One output of processor 31 specifies desired actions to the process being controlled via lead 32; another output from processor 31 controls voice response unit 34, which communicates to the user through speaker 35. Voice response unit 34 could be replaced by a device to display text, such as a video display, if desired. Processor 31 performs the functions of decision mechanism 21 and parameter modifier 23 shown in FIG. 2. Voice response unit 34 and speaker 35 perform the function of indicator 22 shown in FIG. 2. Appropriate computer programs are entered into processor 31 to enable it to perform the functions to be described. Writing such programs in light of the clearly specified functions to be performed is well within the capabilities of those skilled in the art.

Input messages from keyboard 30 to processor 31 can be multiple-word messages. Processor 31 separates the message into its elements, in this case words, recognizes different words and recognizes ends of messages, such as by spaces between words and pauses or delimiters at the ends of messages. However, processor 31 need not be provided with meanings or significance of any words, except that the system's ability to learn is enhanced if processor 31 is programmed initially to recognize affirmative or negative words such as "yes" and "no" or other affirmative or negative phrases. It is also convenient for processor 31 to recognize the passage of a period of time without response as an affirmative response.

Assume that the system can initiate K possible actions, and that the user's goal is to induce the system to initiate a desired action. In this typical application of the inventive principle, the user starts a conversation by making a natural language request for the system to initiate such action. The system then responds by proposing one of the K actions in accordance with its "understanding" of the request. The user then responds with a further message judging the appropriateness of the system's proposed action, possibly using a word or phrase of affirmation or negation and possibly adding additional information clarifying the request. The conversation continues until the system has a clear basis for deciding upon the correct action, whereupon the action is initiated. As the system processes successive conversations and learns the semantic significance of words in relation to desired actions, it becomes able to respond more quickly with the appropriate action.

Figure 4:
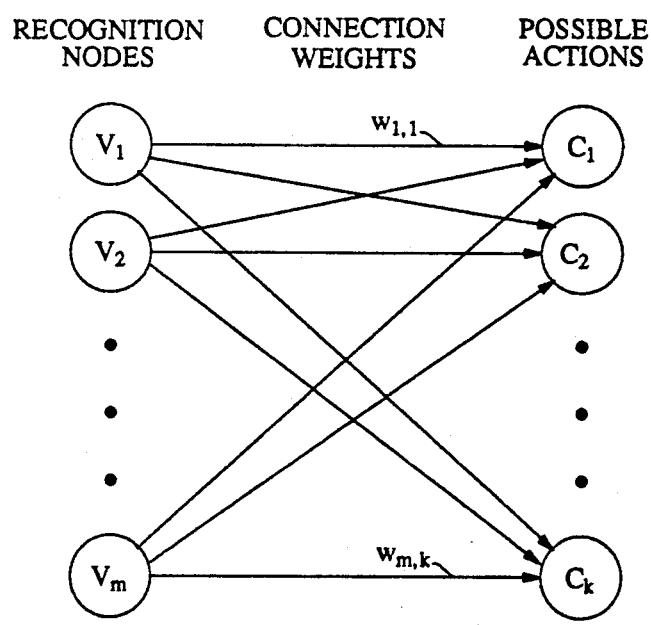
FIG. 4 is a diagram showing a network of connection weights between recognition nodes and possible actions as used in a learning system according to the present invention.

In order to develop the semantic relationship between words in input messages and the possible outputs or actions, processor 31 establishes a recognition node for each new word in each message received and a connection weight between each recognition node and each possible output. FIG. 4 is a diagram showing recognition nodes $v_1-v_M$, possible actions $c_1-c_K$, and the network of connection weights $w_{1,1}-w_{M,K}$, which are shown as arrows connecting the recognition nodes and the possible outputs. The vocabulary of the system, and the number of recognition nodes, grows as successive messages containing new words are received.

There are numerous ways to express the connection weights, but it has been found convenient to define the weights in probabilistic terms as the mutual information $I(v_m,c_k)$ between the recognition nodes $v_m$ and the desired outputs $c_k$ where $$w(v_m,c_k)=I(v_m,c_k)=\log P(v_m|c_k)/P(c_k). \quad (1)$$

An advantage of such definition is that the connection weights can be directly estimated from counts, which can be sequentially accumulated as successive messages are received. Calculation of the connection weights will be described in more detail below.

Figure 5:
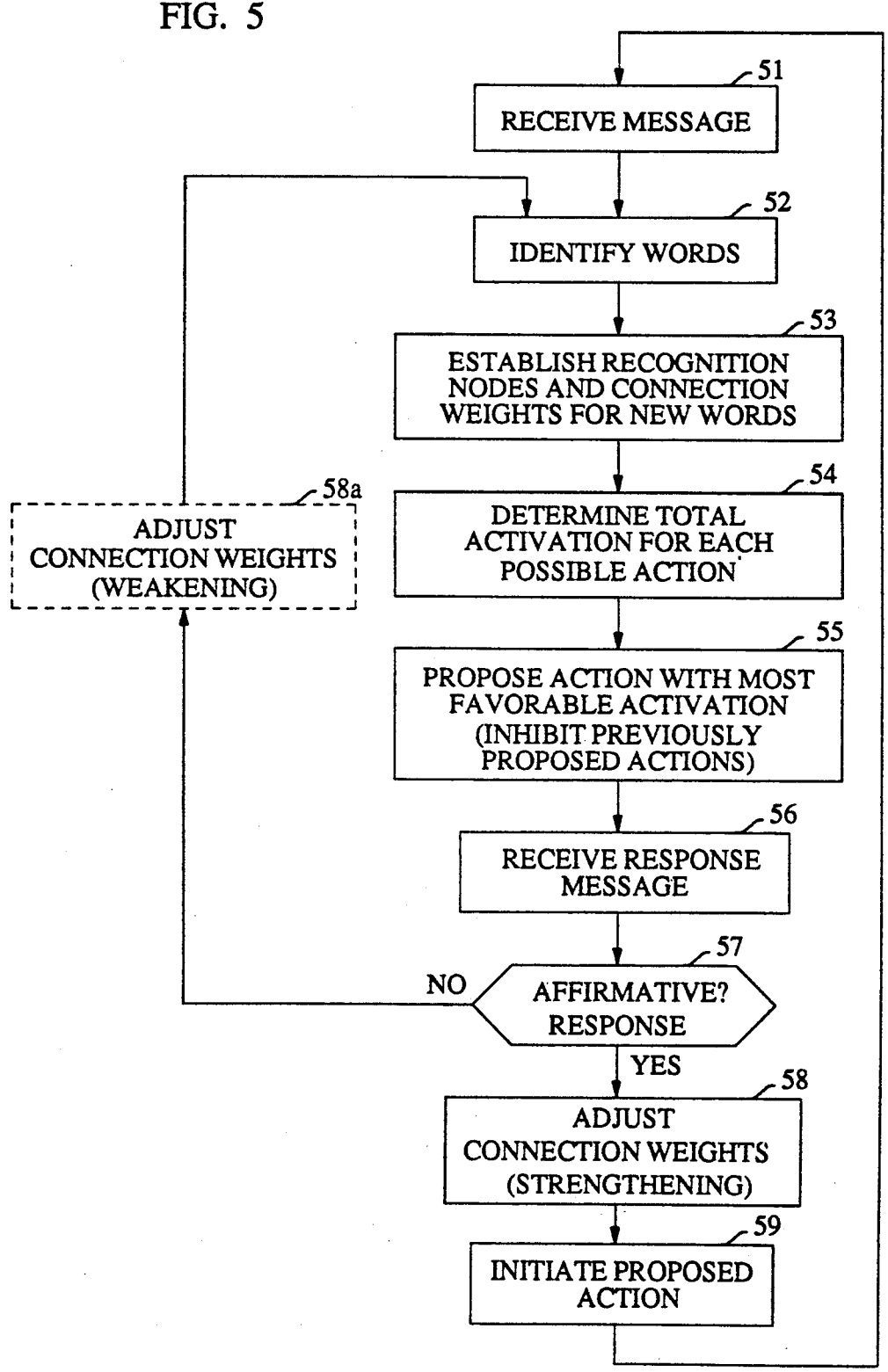
FIG. 5 is a flow chart showing the actions taken upon receipt of a message by the learning system of the present invention.

FIG. 5 is a flow chart showing the steps taken by processor 31 upon receipt of a message. Processor 31 receives the message (block 51), identifies the words in the message (block 52), and establishes a new recognition node and connection weights for each new word in the message (block 53). Initially there is no established relationship between a new word and a desired output, so connection weights are first set at some initial value, possibly zero. At this point, the the recognition nodes for each word in the current message are considered to be activated.

In a basic system for text messages, the activation state of a recognition node can be "1" if its associated word is present exactly in the message and "0" otherwise. In the more general case, the activation state of a recognition node can be represented by the probability that its associated word is present in the current message. Variations of words for which recognition nodes have been established, such as misspellings or different grammatical forms, can then be represented by probabilities between "0" and "1". When probabilities are used, a new recognition node is set up for a word in a message only if such word does not activate an established recognition node with a probability greater than some defined threshold. As is more fully described below in conjunction with the description of FIG. 6, the expression of activation states in terms of probabilities is particularly useful in voice-activated systems.

Referring again to FIG. 5, processor 31 determines the total activation for each possible action (block 54). In the case where the activation state of a recognition node is indicated by a "1" or a "0", the total activation is the sum of the connection weights associated with the recognition nodes indicating "1". In the case where an activated recognition node is indicated by a probability, the total activation is the sum of the connection weights further weighted by the probabilities, that is, the sum of the products of the connection weights and such probabilities.

Next, processor 31 selects and proposes the action having the most favorable activation, for example, the highest sum or weighted sum (block 55), by sending an appropriate feedback message to the user, such as a voice message via voice response unit 34 and speaker 35. (As indicated in block 55, processor 31 can be arranged to inhibit, and not propose, actions that were proposed previously in the conversation and not affirmed by the user.) The user then responds with another message (block 56). If processor 31 can determine immediately that the response message is affirmative (decision block 57), such as by recognizing an initially programmed affirmative word or phrase or by the absence of a response, then the connection weights are adjusted to strengthen the relationship between the activated recognition nodes and the last-proposed action (block 58) and such action can be initiated (block 59). If processor 31 cannot determine that the message is affirmative, then the connection weights may be adjusted (block 58a described below) and the response message is further analyzed and a different action proposed (by repeating the steps shown in blocks 52, 53, 54 and 55). In block 54, as mentioned above, actions previously proposed are not proposed again, eliminating one possible action for each iteration. Processor 31 repeats this sequence until the desired action is reached. Each time an additional message is received, words that were not in previous messages in the conversation create and/or activate additional recognition nodes.

It can be seen that the process described above might not converge on a desired action after a reasonable number of messages. Processor 31 can be arranged to escape to some alternative routine if the desired action is not reached after a given number of messages, or to give a feedback message stating that the action requested is not within the scope of the system's available actions.

Calculation of the connection weights will now be described. The probabilities shown in Equation 1 can be directly estimated from accumulated counts. Thus:

$$P(c_k) = N(c_k)/N(t) \quad (2)$$

and $$P(v_m|c_k) = N(v_m,c_k)/N(v_m) \quad (3)$$

where $N(c_k)$ is the total number of conversations received resulting in action $c_k$, $N_t$ is the total number of conversations, $N(v_m,c_k)$ is the number of times word $v_m$ appears in conversations resulting in action $c_k$ and $N(v_m)$ is the number of conversations in which word $v_m$ appears. If a word appears repeatedly in a conversation, such word can be counted once for the conversation or the number of times it appears. The latter approach will give more weight to repeated words.

Strengthening the connection weights betwewn recognition nodes and affirmed proposed actions also inherently weakens connection weights not strengthened. As represented by block 58a, it is possible to also adjust the connection weights to specifically weaken the relationship between activated recognition nodes and actions for which a negative response is received. Referring back to Equation 3, such weakening can be achieved, for example, by decreasing $N(v_m,c_k)$ if word $v_m$ appears in a message resulting in proposed action $c_k$ and such proposed action receives a negative response.

The probability estimates described above can be somewhat uncertain or "noisy" for small numbers of observations. Various methods of smoothing are well known in the art that can be used to improve the estimates in such cases. For example, the learning system can be started out with an initial estimate or belief of the probabilities of the various outputs that can be specified, and as the number of conversations completed increases, the weight given to the initial estimate is decreased.

It is possible that the results of the summing step (block 54) will be such that the most favorable total activation (block 55) is not significantly different from the next most favorable activation. It may be desirable to establish a threshold value for such activations so that if such value is not reached, processor 31 responds with a tentative proposal for action or a request for more information.

Figure 6:
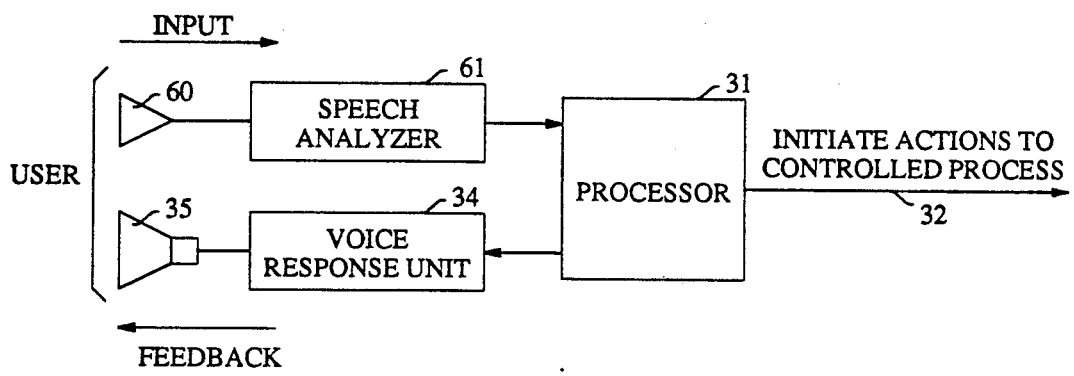
FIG. 6 is a block diagram of a voice-activated system for use in accordance with the present invention.

FIG. 6 is a block diagram of a voice-activated system for use in accordance with the present invention. Such system is almost identical to that shown for the text-activated system shown in FIG. 3 except for the substitution of microphone 60 and speech analyzer 61 for keyboard 30. Clearly, communication with the user can be over a conventional telephone channel. Speech analyzer 61 can be any of a number of devices known in the art. An example is shown in U.S. Pat. No. 4,181,821 entitled Multiple Template Speech Recognition System. Analyzer 61 provides information to processor 31 about specific characteristics of the speech received. Processor 31 detects words by looking for matches between this information and word profiles or templates established for previously-received words and expresses the presence of a word in a message, and the activation state of its associated recognition node, as a number between "0" and "1", indicating the probability that the word is in the message. If the match between such information and the established word templates does not reach a certain threshold, then processor 31 stores a profile and establishes a new recognition node for that word. In determining the total activation for each action (block 54 in FIG. 5), processor 31 multiplies the connection weights by the probabilities expressed for their respective recognition nodes. Thus, such probabilities are incorporated into the decision as to which action to propose.

Figure 7:
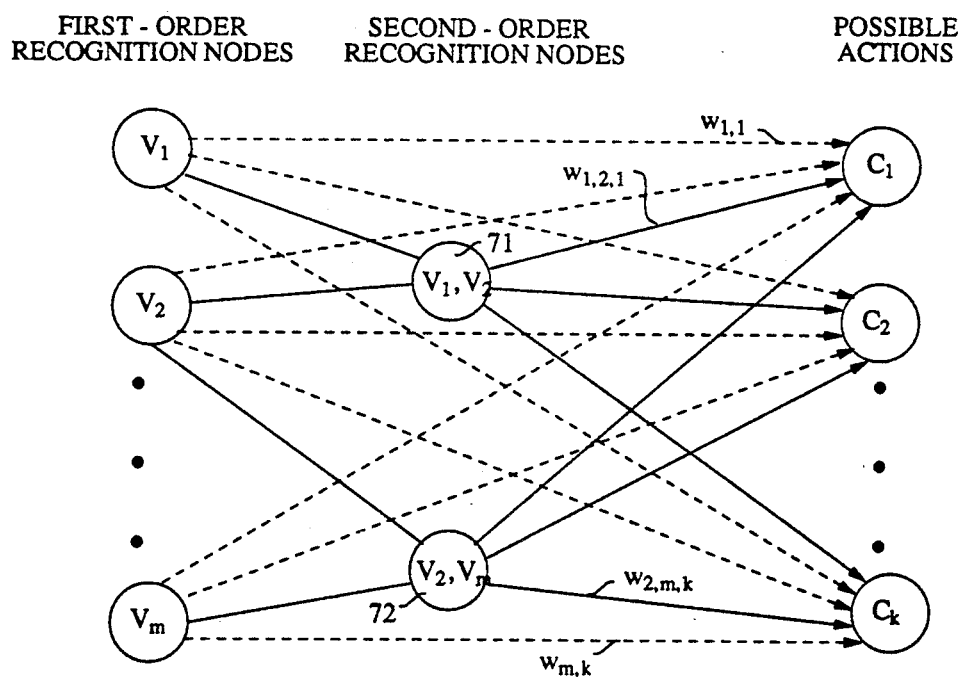
FIG. 7 is a diagram similar to FIG. 4 showing additional recognition nodes for groups of words and a multi-layer network of connection weights.

FIG. 7 is a diagram similar to FIG. 4 but also showing second-order recognition nodes and an additional layer of connection weights in addition to the first-order recognition nodes and their associated connection weights. For clarity, the first layer of connection weights is denoted by dashed lines and the second layer by solid lines. The second-order recognition nodes are used to give weight to groups or combinations of words appearing in input messages, which gives the system the ability to react to the semantic and/or syntactic significance of the presence of such combinations in input messages. As shown in FIG. 7, second-order node 71 indicates the appearance of both words $v_1$ and $v_2$ in an input message and second-order node 72 indicates the appearance of both words $v_2$ and $v_M$ in an input message.

The second-order nodes shown are for combinations of two words; however, such nodes can be established for combinations of any number. Also, such nodes can be set up for combinations of adjacent words in the message as well as for combinations without regard to adjacency. Such nodes for combinations of adjacent words enable the system to give weight to the presence of phrases in input messages. Clearly, similar nodes of third and higher orders can also be established if desired, and also nodes having inputs from different orders. In general, higher-order recognition nodes can be established having inputs that are the activation states of any number and any level of other recognition nodes.

Higher-order nodes for combinations as described above need only be established if the combination defining the node appears in an input message. Connection weights for combinations are determined similarly to those for words. One convenient probabilistic way to express the connection weight for a combination is as the excess mutual information of the combination over the individual words. Thus, for a second-order node $v_m, v_n$:

$$w(v_m, v_n, c_k) = I(v_m, v_n, c_k) - I(v_m, c_k) - I(v_n, c_k), \quad (4)$$

which can be calculated using counts of occurrences of the combination as has been described above for words.

The activation states of higher-order nodes reflect the activation states of the lower-order nodes to which they connect. There are many ways of combining the activation states of lower-order nodes to create the activation state of a higher-order node. For example, when the activation state of the lower-order nodes is "0" or "1", as in the basic system for text input described above, the activation state of the higher-order node can simply be the Boolean AND function of the inputs. When the activation state of the lower-order nodes is a probability, as in the system for speech input as described above, the activation state of a higher-order node can be the product of its input probabilities.

We have conducted experiments with a language-acquisition system designed in accordance with the present invention for use in an inward call management application. Such system accepted text as input and could select from three possible actions. Over the course of 1074 conversations, the system acquired a vocabulary of over 1600 words and averaged 1.2 new words per conversation. The connection weights were adjusted (in accordance with Equations 1, 2 and 3) when a proposed action was affirmed by the user. No adjustment was made for proposed actions receiving a negative response. Such system is described in A. L. Gorin et al., "On Adaptive Acquisition of Language", Proceedings of the 1990 International Conference on Acoustics, Speech, and Signal Processing, April 1990. A similar system including a multi-layer network with second-order nodes is described in A. L. Gorin et al., "Adaptive Acquisition of Language", Proceedings of the Sixth Yale Workshop on Adaptive and Learning Systems, August 1990.

As can be seen from the above description, a learning system constructed in accordance with the present invention acquires knowledge about the semantic significance of elements of messages or subsets of signal patterns from a user or source. Such knowledge becomes learned by adjusting connection weights relating such elements or subsets to possible outputs in response to further inputs or patterns of signals from the user or source. It can also be seen that the system can acquire knowledge without being preprogrammed with the meanings of words or phrases or patterns of signals. It should also be made clear that inputs to such a learning system can be signals other than those representing text or speech and that such signals can originate in other contexts or from other processes or systems. Similarly, the outputs from such a system, while needing to be defined and finite, can be used as inputs to similar learning systems.

Apparatus for implementing the invention has been described above in terms of various input-output devices connected to a programmed general-purpose digital computer. Alternatively, such a computer can be replaced with special purpose hardware designed specifically to perform the equivalent functions. Still another alternative is to store instructions for the digital computer in a read-only memory, resulting in a combination which can be said to be equivalent to specifically-designed hardware. Given the above description of the invention, implementation of such alternatives would be well within the capabilities of those skilled in the art.

It is understood that other embodiments are possible that incorporate the principles of our invention and that the above disclosure is merely illustrative of such principles and is not intended to be limiting in any respect.

We claim:

1. The method of conditioning a machine for selecting one of a plurality of outputs in response to applied inputs, each input containing one or more elements, comprising the steps of:

establishing a recognition node for each distinct element in said inputs, said recognition node having activation states indicating the presence or absence of said element in an input;

defining weighting relationships between each said recognition node and each said output;

determining, in response to each input, a total activation for each said output from said weighting relationships and the activation states of said recognition nodes;

selecting, in response to said determining step, the output having the most favorable total activation;

proposing the output selected in said selecting step;

adjusting said weighting relationships in response to an input received subsequent to said proposing step in accordance with whether or not said subsequent input indicates that said proposed output is correct;

whereby, as successive inputs are received, said weighting relationships become adapted to represent associations between semantically significant ones of said elements and said outputs.

2. The method of claim 1 wherein said activation states of said recognition nodes are expressed as probabilities and said determining step further comprises calculating said total activations as sums of products of said weighting relationships and said probabilities.

3. The method of claim 1 wherein said adjusting step further comprises calculating said weighting relationships to be the mutual information $I(c_k, v_m)$ between said recognition nodes $v_m$ and said actions $c_k$ and wherein $$I(c_k, v_m) = \log P(c_k|v_m)/P(c_k).$$

4. The method of claim 1 wherein said inputs further comprise text and said elements further comprise words.

5. The method of claim 4 wherein said text further comprises spoken utterances and said words further comprise spoken words.

6. The method of claim 4 wherein said establishing step further comprises establishing recognition nodes for adjacent words in said text.

7. The method of claim 1 which includes the additional step of defining at least one of said elements to signify a correct proposed output.

8. The method of claim 1 which includes the additional step of defining the expiration of a waiting period after said proposing step to signify a correct proposed output.

9. The method of claim 1 wherein said proposing step further comprises displaying text.

10. The method of claim 1 wherein said proposing step further comprises reciting speech.

11. The method of claim 1 wherein said establishing step further comprises establishing recognition nodes for groups of said elements.

12. The method of claim 1 which includes the additional step of defining at least one of said elements to signify an incorrect proposed output.

13. The method of claim 1 wherein said establishing step further comprises establishing recognition nodes that respond to the activation states of at least two other recognition nodes.

14. The method of claim 1 including the additional step of, before the proposing step, inhibiting actions proposed in response to previous inputs.

15. The method of claim 1 including the additional step of initiating said proposed output if said subsequent input indicates that said proposed output is correct.

16. A machine-based system for selecting one of a plurality of outputs in response to inputs, each said input containing one or more elements, and for learning associations between said elements and said actions, which comprises:

means for receiving said inputs;

means responsive to said inputs for establishing a recognition node for each distinct element in said inputs, said recognition node having activation states indicating the presence or absence of said element in an input;

means for defining weighting relationships between each said recognition node and each said output;

means for determining, in response to receiving each input, a total activation for each said output from said weighting relationships and the activation states of said recognition nodes means responsive to said determining means for selecting the output having the most favorable total activation;

means responsive to said selecting means for proposing the selected action;

means for adjusting said weighting relationships in response to an input received subsequent to proposing said output in accordance with whether or not said subsequent input indicates that said proposed output is correct;

whereby, as successive inputs are received, said weighting relationships become adapted to represent associations between semantically significant ones of said elements and said outputs.

17. The system of claim 16 wherein the means for establishing also comprises means for establishing recognition nodes that respond to the activation states of at least two other recognition nodes.

18. The system of claim 16 which further comprises means for initiating a proposed output if said subsequent input indicates that such output is correct.

19. The system of claim 16 in which said means for establishing, means for defining, means for determining, means for selecting and means for adjusting collectively further comprise a programmed digital computer.

* * * * *